(12) United States Patent
Bassett

(10) Patent No.: US 9,681,601 B2
(45) Date of Patent: Jun. 20, 2017

(54) HYDRAULIC CYLINDER FOR AN AGRICULTURAL ROW UNIT HAVING AN UPLIFT ACCUMULATOR AND A DOWN PRESSURE ACCUMULATOR

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

(*) Notice: Subject to any disclaimer, the term of this patent is extended or adjusted under 35 U.S.C. 154(b) by 114 days.

(21) Appl. No.: 14/593,492

(22) Filed: Jan. 9, 2015

(65) Prior Publication Data

US 2016/0198623 A1     Jul. 14, 2016

(51) Int. Cl.
*A01C 7/20*     (2006.01)
*A01B 63/111*   (2006.01)
*F16F 9/06*     (2006.01)

(52) U.S. Cl.
CPC ............ *A01C 7/205* (2013.01); *A01B 63/111* (2013.01); *F16F 9/065* (2013.01); *A01C 7/203* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,103,993 | A * | 9/1963 | Gies | F16F 9/42 188/274 |
| 4,648,466 | A * | 3/1987 | Baker | A01C 7/205 172/260.5 |
| 5,499,042 | A * | 3/1996 | Yanagawa | B41J 2/14209 347/12 |
| 5,709,271 | A * | 1/1998 | Bassett | A01B 63/114 111/134 |
| 6,085,501 | A * | 7/2000 | Walch | A01B 63/10 172/7 |
| 8,746,661 | B2 * | 6/2014 | Runkel | F16F 9/067 188/203 |
| 2009/0260902 | A1 * | 10/2009 | Holman | F16F 9/063 180/6.7 |
| 2011/0147148 | A1 * | 6/2011 | Ripa | F16F 9/44 188/322.13 |
| 2012/0060730 | A1 * | 3/2012 | Bassett | A01C 7/205 111/149 |
| 2014/0000448 | A1 * | 1/2014 | Franklin, III | F16F 9/56 91/4 R |

* cited by examiner

*Primary Examiner* — Alicia Torres
(74) *Attorney, Agent, or Firm* — Nixon Peabody LLP

(57) ABSTRACT

An agricultural row unit includes a gauge wheel that engages the soil to control the elevation of the row unit; a soil-engaging tool mounted to permit vertical movement of the tool relative to the row unit; a hydraulic cylinder having a movable rod and containing a pressurized hydraulic fluid for applying a down force to the the tool to urge the tool into the soil; an uplift accumulator housed within the rod and exposed to the hydraulic fluid to permit upward movement of the tool in response to increased resistance by the soil to downward movement of the tool, while applying a force resisting upward movement of the tool; and a down pressure accumulator coupled to the hydraulic cylinder to permit downward movement of the tool in response to decreased resistance by the soil to downward movement of the tool, while applying a force resisting downward movement of the tool.

8 Claims, 14 Drawing Sheets

HYDRAULIC CYLINDER FOR AN AGRICULTURAL ROW UNIT HAVING AN UPLIFT ACCUMULATOR AND A DOWN PRESSURE ACCUMULATOR

FIELD OF THE INVENTION

The present invention relates generally to agricultural equipment and, more particularly, to row crop implements having automatic control systems.

SUMMARY

In accordance with one embodiment, an agricultural row unit includes a frame having a gauge wheel that engages the soil to control the elevation of the frame; a soil-engaging tool coupled to the frame to permit vertical movement of the tool relative to the frame; a hydraulic cylinder having a movable rod and containing a pressurized hydraulic fluid for applying a down force to the frame or the tool to urge the tool into the soil; an uplift accumulator housed within the rod and exposed to the hydraulic fluid to permit upward movement of the tool in response to increased resistance by the soil to downward movement of the tool, while applying a force resisting upward movement of the tool; and a down pressure accumulator coupled to the hydraulic cylinder to permit downward movement of the tool in response to decreased resistance by the soil to downward movement of the tool, while applying a force resisting downward movement of the tool.

In one implementation, the accumulators are piston-type accumulators, and the fluid communication between the second accumulator and the hydraulic cylinder is restricted to control the rate of the rebound damping. The second accumulator preferably includes heat dissipating surfaces to remove heat produced by conversion of kinetic energy to heat in the restriction.

In a preferred implementation, the rod has a hollow interior and the first accumulator includes a piston that is slidable along the length of the hollow interior of the rod, the piston dividing the hollow interior of the rod into two compartments that are sealed from each other by the piston. The rod telescopes into the hydraulic cylinder through one end of the cylinder and has an open inner end and a sealed outer end. The portion of the rod on the side of the piston facing the open end of the rod is filled with pressurized hydraulic fluid which also fills the portion of the cylinder adjacent the open end of the rod, and the portion of the rod on the side of the piston facing the sealed outer end of the rod is filled with a compressible pressurized gas.

Controllable latching valves may be coupled to the hydraulic cylinder for controlling the coupling of the cylinder to a pressurized hydraulic supply system.

BRIEF DESCRIPTION OF THE DRAWINGS

The invention may best be understood by reference to the following description taken in conjunction with the accompanying drawings, in which.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
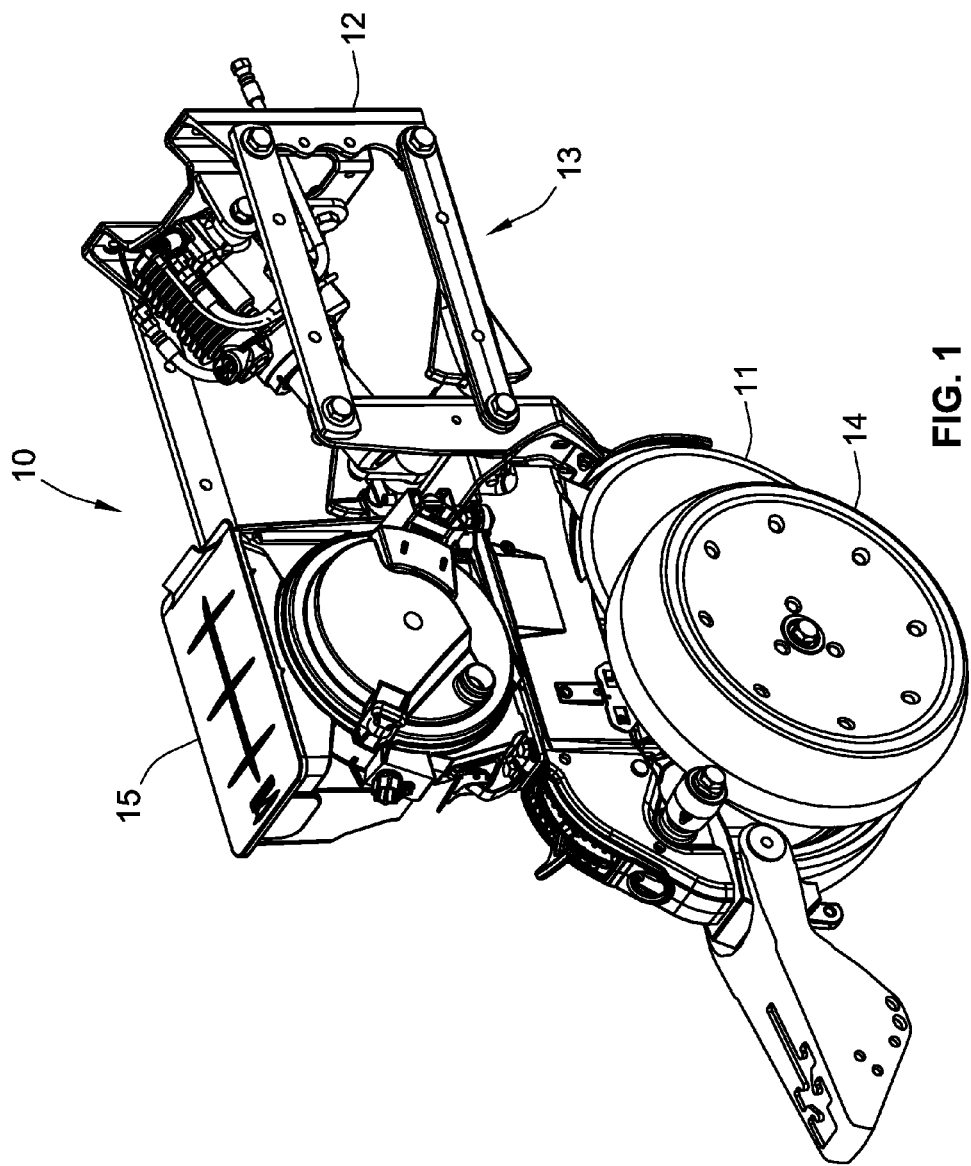
FIG. 1 is a perspective view of a planting row unit adapted to be attached to a towing frame.
Figure 2:
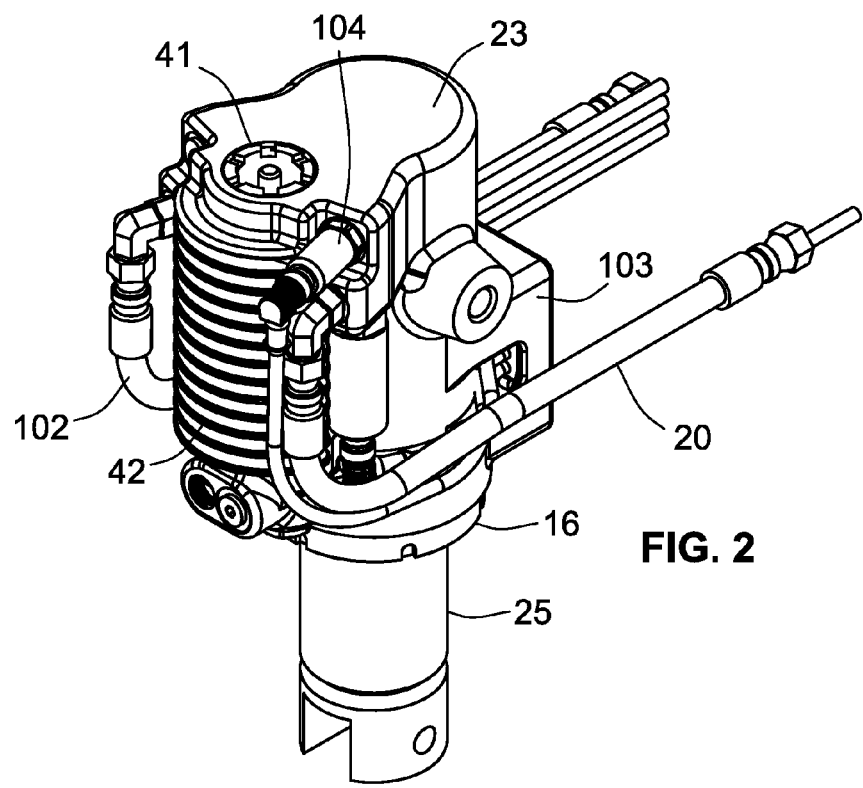
FIG. 2 is an enlarged perspective view of the down-pressure control assembly in the row unit of FIG. 1.
Figure 3:
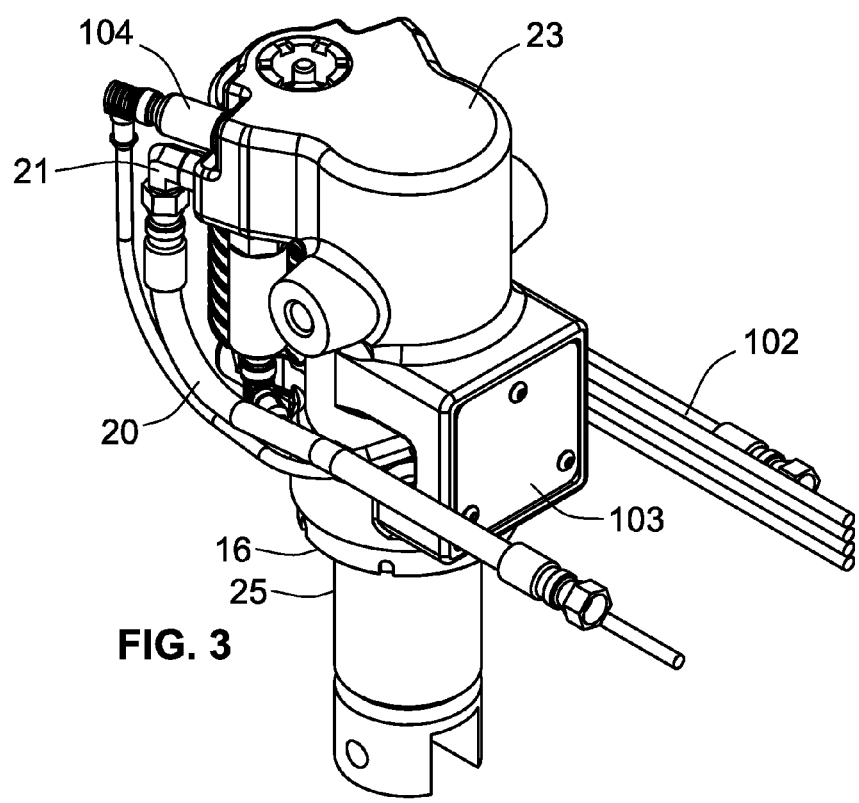
FIG. 3 is the same perspective view shown in FIG. 2, rotated 90 degrees in a clockwise direction.
Figure 5:
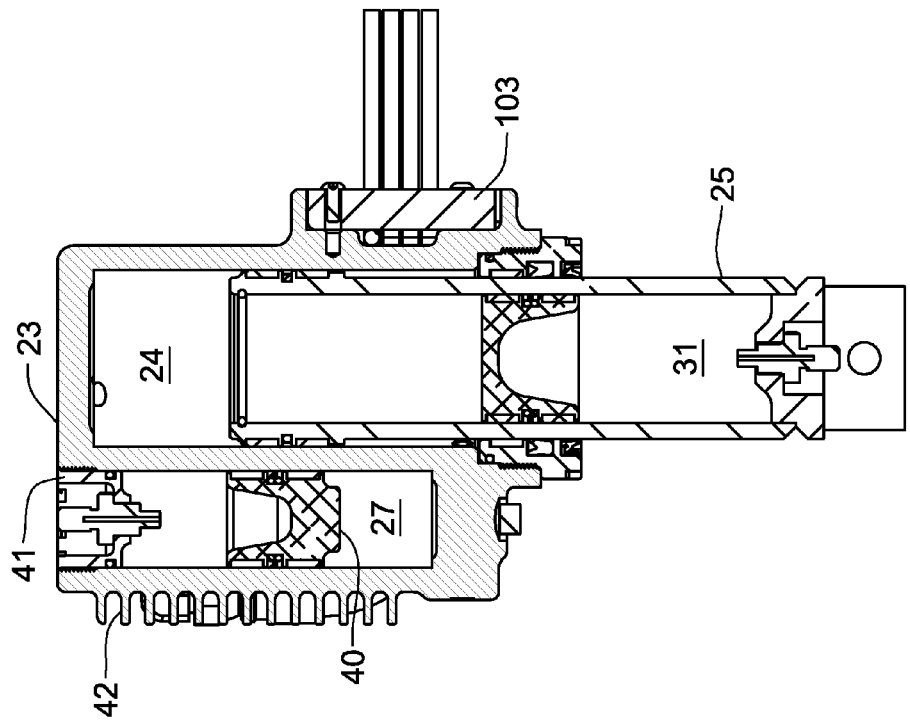
FIG. 5 is a section taken along line 5-5 in FIG. 4.
Figure 4:
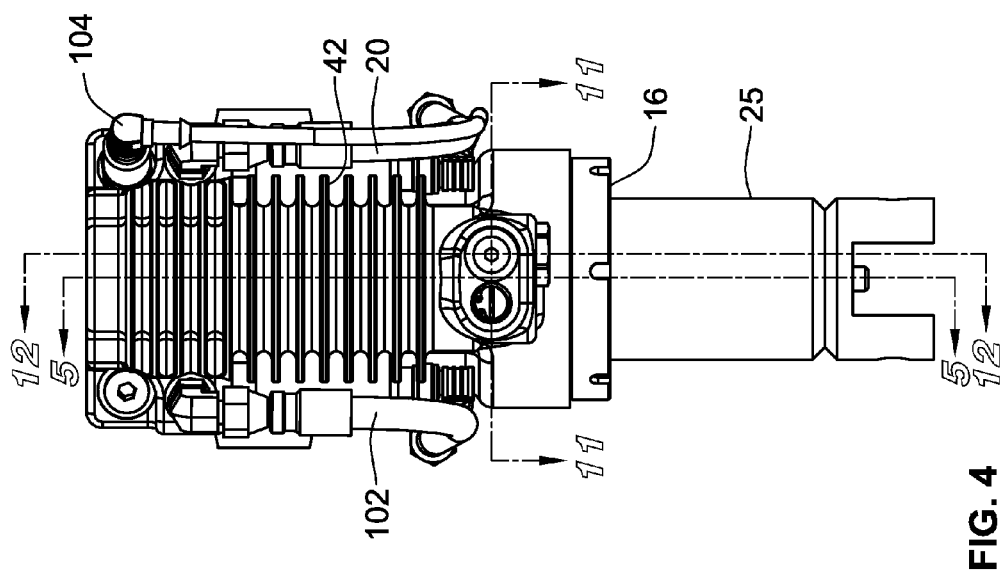
FIG. 4 is an enlarged side elevation of the control assembly shown in FIGS. 2 and 3, from the left side of the assembly as shown in FIG. 2.
Figure 7:
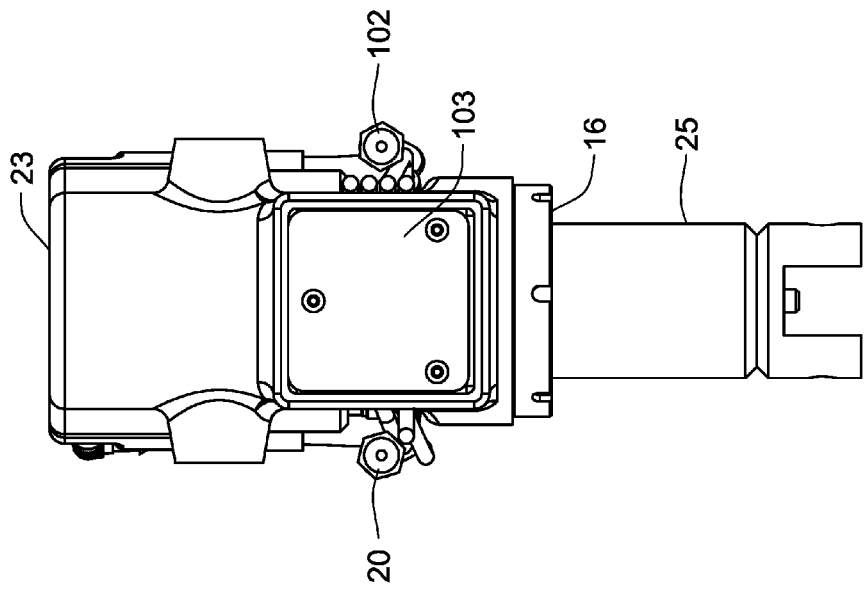
FIG. 7 is a side elevation of the right side of the control assembly shown in FIG. 6.
Figure 6:
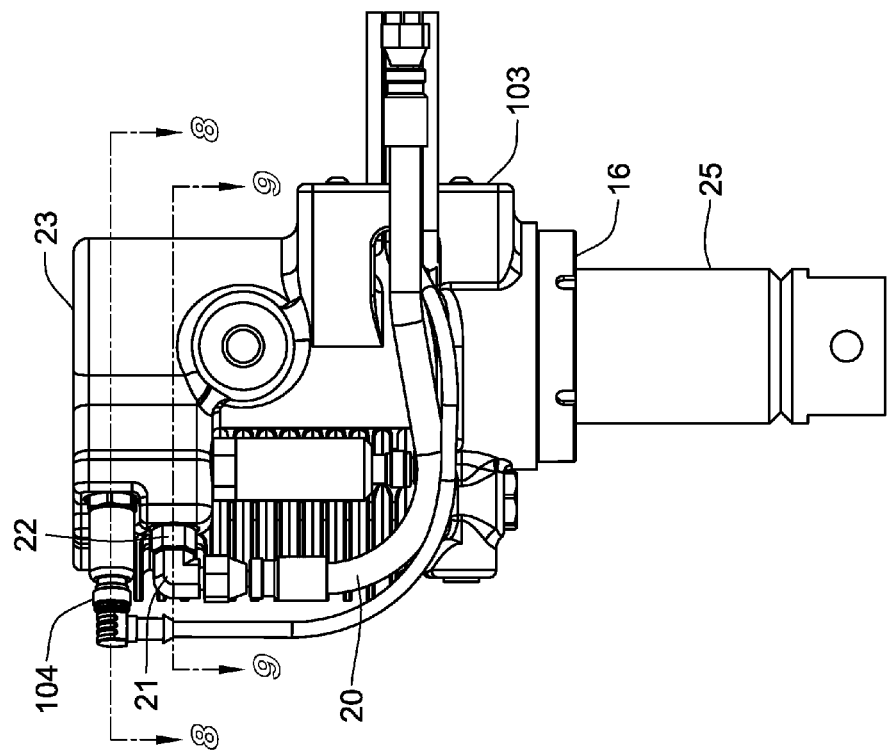
FIG. 6 is a side elevation of the right side of the control assembly shown in FIG. 4.
Figure 8:
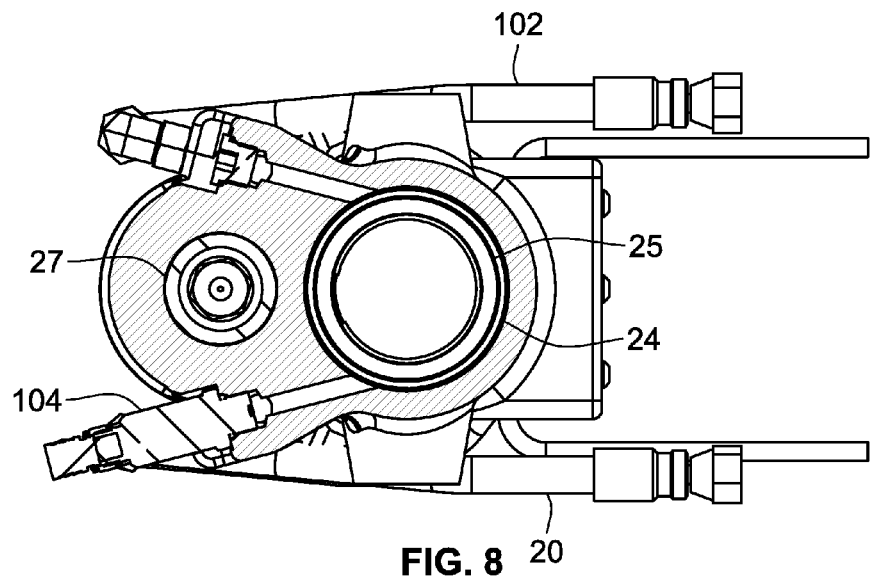
FIG. 8 is a section taken along line 8-8 in FIG. 6.
Figure 9:
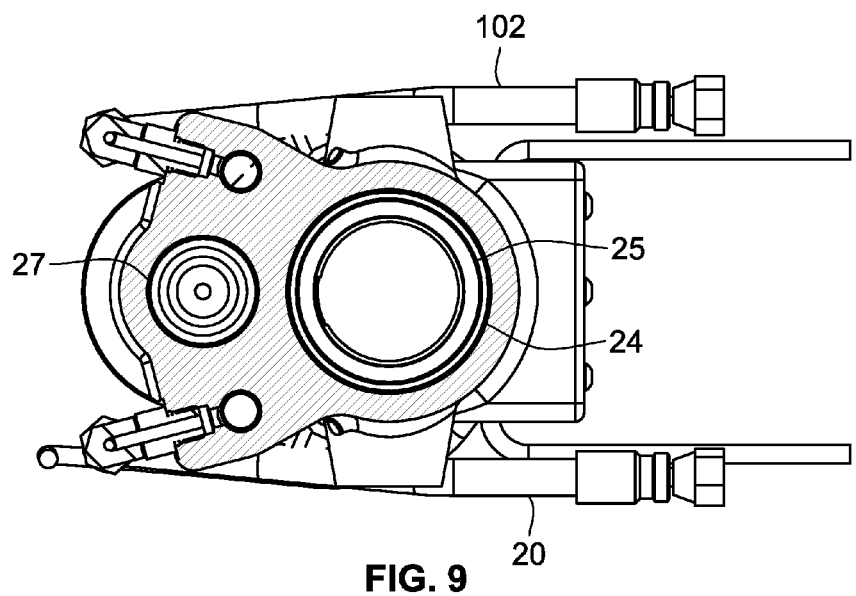
FIG. 9 is a section taken along line 9-9 in FIG. 6.
Figure 11:
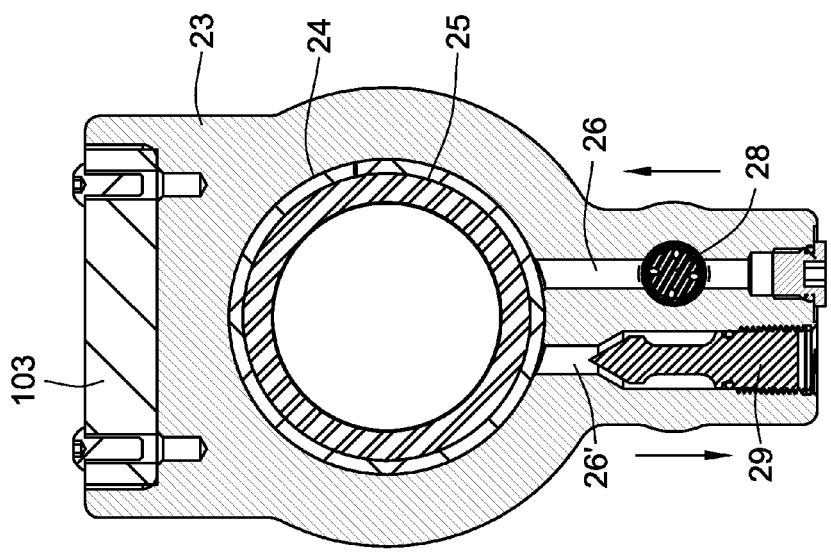
FIG. 11 is a horizontal section taken through the two ports shown in FIG. 11, with all the parts assembled.
Figure 10:
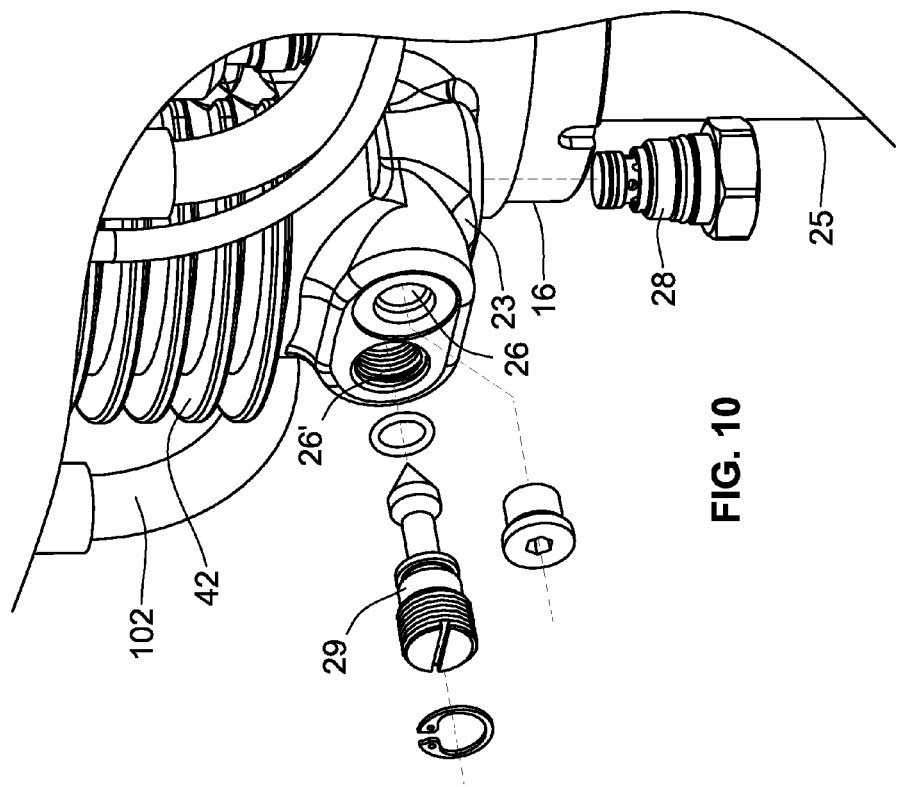
FIG. 10 is an enlarged exploded perspective of the central portion of the left side of the control assembly shown in FIG. 2.
Figure 12:
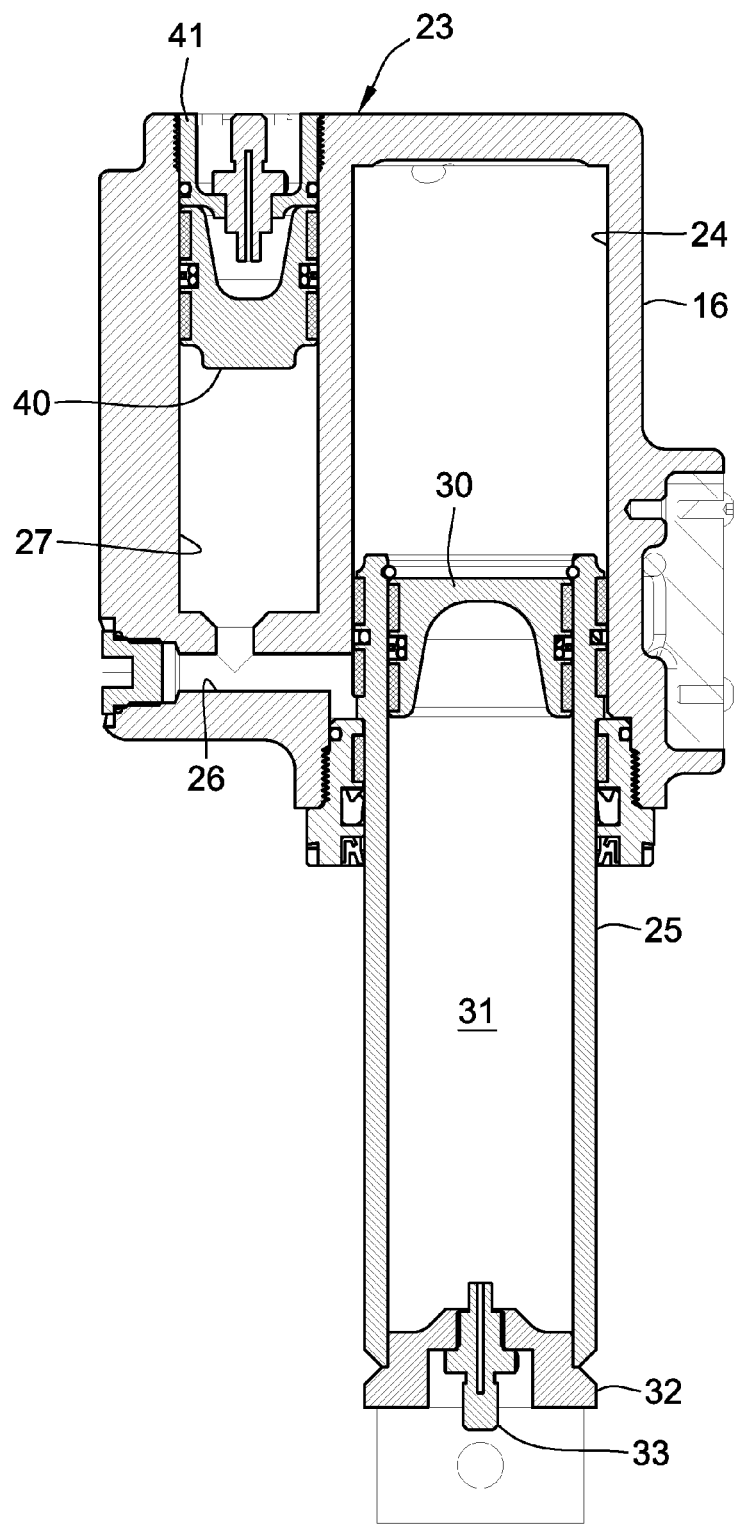
FIG. 12 is a vertical section taken through the middle of the control assembly shown in FIG. 7, with the rod of the hydraulic cylinder in its fully extended position.

Turning now to the drawings and referring first to FIG. 1, a planting row unit 10 includes a furrow-opening device 11 for the purpose of planting seed or injecting fertilizer into the soil. A conventional elongated hollow towing frame (typically hitched to a tractor by a draw bar) is rigidly attached to the front frame 12 of a conventional four-bar linkage assembly 13 that is part of the row unit 10. The four-bar (sometimes referred to as "parallel-bar") linkage assembly 13 is a conventional and well known linkage used in agricultural implements to permit the raising and lowering of tools attached thereto.

As the planting row unit 10 is advanced by the tractor, the opening device 11 penetrates the soil to form a furrow or seed slot. Other portions of the row unit 10 then deposit seed in the seed slot and fertilizer adjacent to the seed slot, and close the seed slot by distributing loosened soil into the seed slot with a pair of closing wheels. A gauge wheel 14 determines the planting depth for the seed and the height of introduction of fertilizer, etc. Bins 15 on the row unit carry the chemicals and seed which are directed into the soil. The planting row unit 10 is urged downwardly against the soil by its own weight, and, in addition, a hydraulic cylinder 16 is coupled between the front frame 12 and the linkage assembly 13 to urge the row unit 10 downwardly with a controllable force that can be adjusted for different soil conditions. The hydraulic cylinder 16 may also be used to lift the row unit off the ground for transport by a heavier, stronger, fixed-height frame that is also used to transport large quantities of fertilizer for application via multiple row units.

The hydraulic cylinder 16 is shown in more detail in FIGS. 2-5 and 6-14. Pressurized hydraulic fluid from the tractor is supplied by a hose 20 to a port 21 that leads into a matching port 22 of a unitary housing 23 that forms a cavity 24 of a hydraulic cylinder containing a hollow rod 25. The housing 23 also forms a side port 26 that leads into a second cavity 27 that contains hydraulic fluid that can be used to control the down pressure on the row unit, as described in more detail below.

The hydraulic control system includes a pair of controllable 2-way hydraulic lines 101 and 102 leading to the hydraulic cylinder in the unitary housing 23, which includes an integrated electronic controller 103. The hydraulic lines 101 and 102 are coupled to a pressure/inlet valve and a return outlet valve which are controlled by signals from the controller 103. The controller 103 receives input signals from a pressure transducer 104 that senses the pressure in the cavity 24, and a gauge wheel sensor that monitors the elevation of a tool relative to the elevation of the gauge wheel.

Slidably mounted within the hollow interior of the rod 25 is a down-pressure accumulator piston 30, which forms one end of a sealed chamber 31 containing pressurized gas that is part of the down-pressure accumulator. The lower end of the chamber 31 is sealed by a rod end cap 32 that contains a valve 33 for use in filling the chamber 31 with pressurized gas. Thus, the down-pressure accumulator is formed entirely within the hollow rod 25

The hydraulic pressure exerted by the hydraulic fluid on the end surface of the rod 25 and the accumulator piston 30 urges the rod 25 downwardly, with a force determined by the pressure of the hydraulic fluid and the area of the exposed end surfaces of the rod 25 and the piston 30. The hydraulic fluid thus urges the rod 25, and thus the row unit, in a downward direction, toward the soil.

Figure 14:
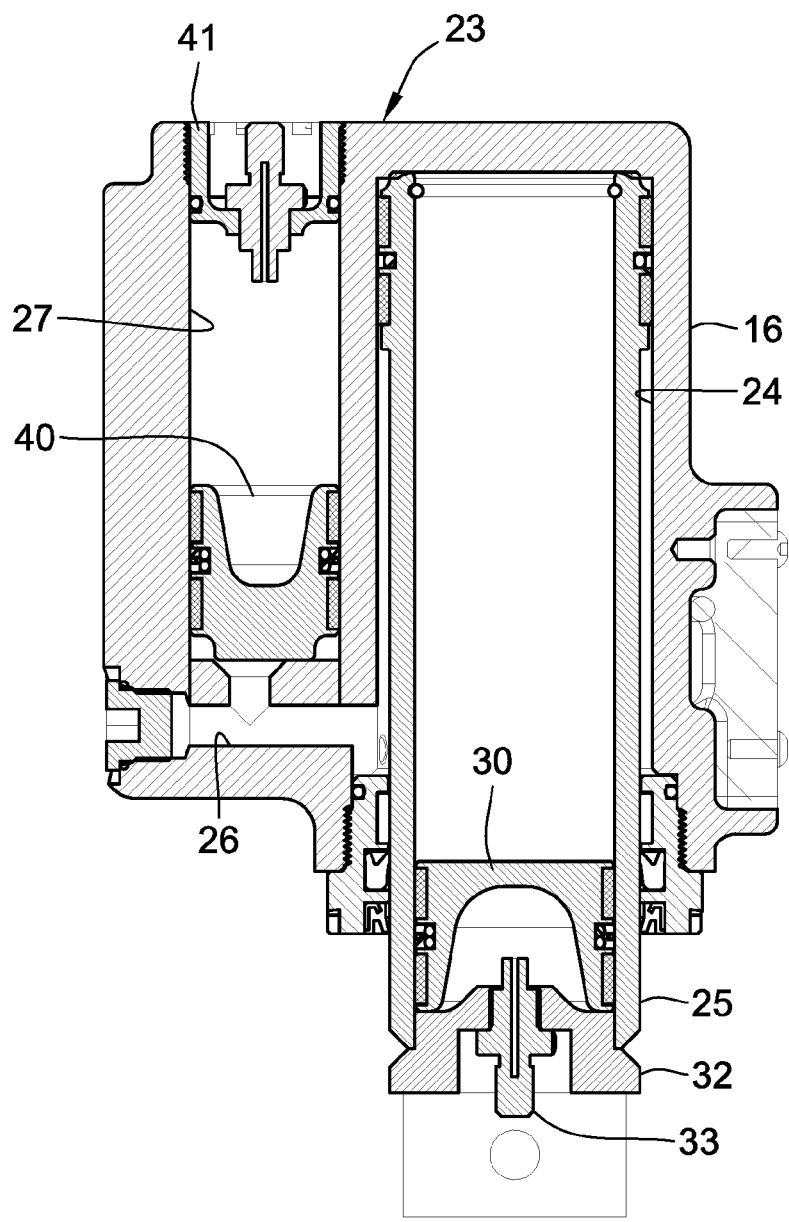
FIG. 14 is the same vertical section shown in FIG. 12, with the rod of the hydraulic cylinder in its fully retracted position.

When an upward force is exerted on the rod 25, such as when a rock or increased soil hardness is encountered, the rod 25 is moved upwardly within the cavity 24, as depicted in FIG. 14. Because the cavity 24 is filled with pressurized hydraulic fluid in the cavity 24, the accumulator piston 30 does not move upwardly with the rod 25, as depicted in FIG. 14. Thus, the pressurized gas between the accumulator piston 30 and the cap 32 at the lower end of the rod 25 is further compressed. This process continues as the rod 25 moves upwardly within the cavity 24, until the upper end of the rod engages the housing 16, as depicted in FIG. 15. In this fully retracted position of the rod 25, the accumulator piston 30 engages the end cap 32 on the lower end of the rod 25.

Figure 13:
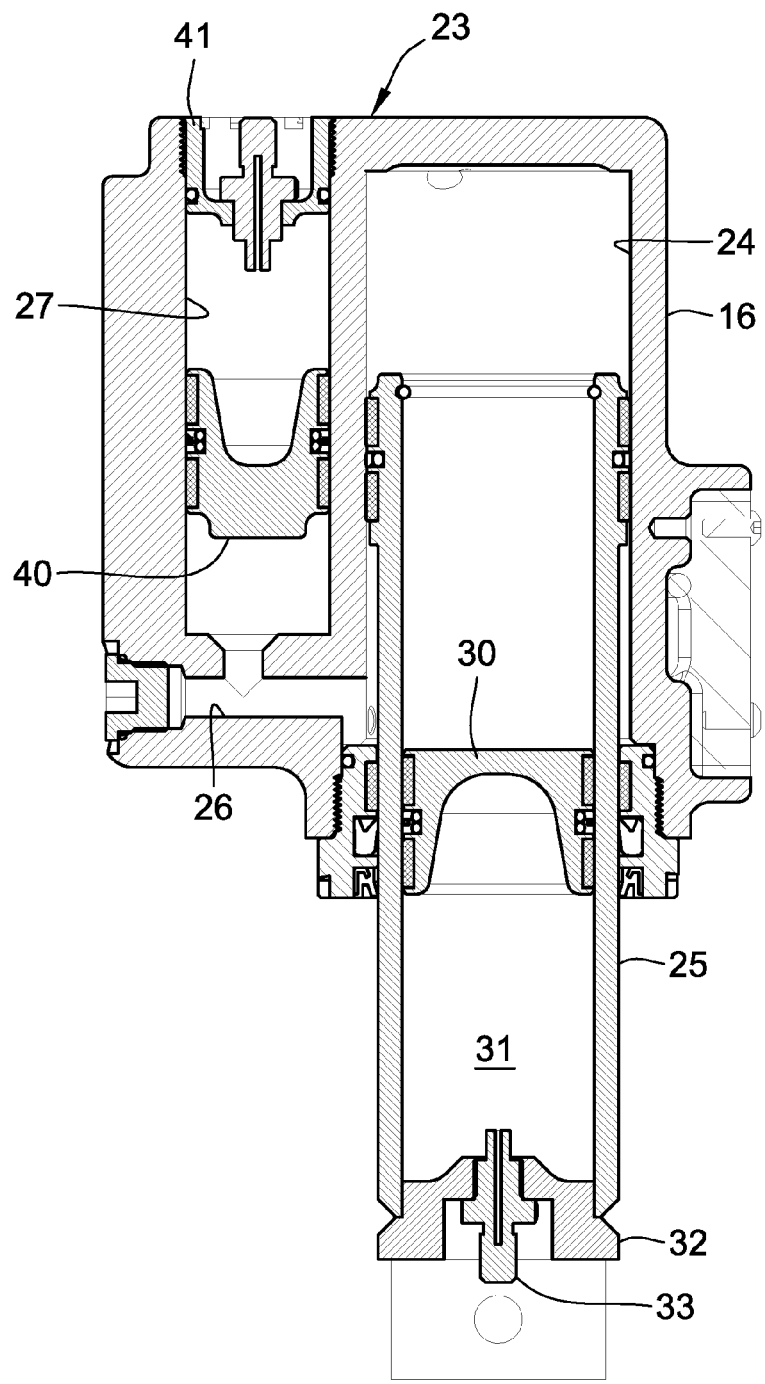
FIG. 13 is the same vertical section shown in FIG. 12, with the rod of the hydraulic cylinder in an intermediate position.

During upward movement of the rod 25 and downward movement of the accumulator piston 30, hydraulic fluid flows from the second cavity 27 through the conduit 26 into the space between the outer surface of the rod 25 and the wall of the cavity 24. The hydraulic fluid if urged in this direction by a second accumulator formed by a piston 40 and a charge of pressurized gas between the piston 40 and an end cap 41 that seals the top of the cavity 27. As can be seen in FIGS. 13 and 14, the compressed gas urges the piston 40 downwardly as the rod 25 moves upwardly, thus forcing hydraulic fluid from the cavity 27 through a check valve 28 into the increasing space between the outer surface of the rod 25 and the wall of the cavity 24. In FIG. 14, the rod 25 has been withdrawn to its most retracted position, and the accumulator piston 40 has moved to its lowermost position where it engages the bottom end wall of the cavity 27. At this point, the row unit is in its uppermost position.

The process is reversed when the rod 25 returns to its extended position, with the accumulators providing dynamic "rebound" damping during this return movement. As the rod 25 moves downwardly, hydraulic fluid is returned to the cavity 27 through a restriction 29 to damp the downward movement of the rod. The restriction 29 can be adjusted by turning the screw formed by the outer end portion of the tapered pin 29a that forms the restriction 29. The return flow rate of the hydraulic fluid is also affected by the pressure of the gas in the space above the accumulator piston 40, which must be overcome by the returning hydraulic fluid to move the piston 40 upwardly.

It will be appreciated that the system described above does not require any hydraulic fluid to flow into or out of the housing 23 during advancing and retracting movement of the rod 25 that controls the vertical position of the row unit relative to the soil. Thus, there is no need to open or close any valves to control the flow of hydraulic fluid in and out of the tractor reservoir of hydraulic fluid. This is not only more efficient than moving hydraulic fluid to and from the main reservoir, but also makes the operation of the row unit much smoother, which in turn improves the delivery of seed and/or fertilizer to the desired locations in the soil. The actuator assembly is normally closed with no fluid entering or leaving the actuator/accumulator assembly unless one or more valves are opened. There is also an advantage in using two valves because a 2-position, 1-way valve can be made fast-acting more readily that a 3-position, 2-way valve. Moreover, the computer controller can be directly integrated into the actuator assembly. The single double-acting actuator with two accumulators, one acting in the downward direction and one acting in the upward direction, can be mounted in the same location as previous actuators used on row units.

The present system has an accumulator on both sides of the actuator, with valves that control flow, not pressure, so that the actuator can become a totally closed system with no oil entering or leaving. The compensator design is linear because the piston accumulator is packaged within the inner diameter of the ram of a larger cylinder, which reduces the number of parts as well as the size of the actuator unit. The linear compensator design allows perfectly open and unrestricted flow of oil in the compression direction, which is advantageous because of the need to rapidly absorb energy when the row unit hits a rock or obstacle.

When the valves have a "latching" feature, the spools of the valves can be rapidly magnetized and demagnetized. This allows the valve to latch magnetically in either the open or closed condition so that the valve does not consume power continuously, as a typical proportional coil valve does. Moreover, the latching valve design takes advantage of the ability of the accumulators to allow the planter linkage to float up and down without requiring any gain or loss of fluid. Rather, the down pressure on the planter may be changed by holding either the pressure or return valve open for varying pulse width modulated durations to achieve a rise or drop in down pressure. These valves may have a very fast rate of change between open and closed conditions. If the valve changes state very quickly, typically less than 10 milliseconds, and requires no power to remain either open or closed, it is possible to achieve negligible power consumption system because the probability that any two valves will be in the process of opening or closing at the exact same time is very low.

Planter row units have varying unsprung weights (the portion of the planter row unit weight that is carried by the gauge wheels and not the frame. In some tillage and soil conditions which are very soft or prone to compaction, it can be advantageous to suspend some or all of this weight by pushing upward against it.

By pressurizing the uplift accumulator by filling gas through the gas valve, the gas pressure increases, pushing the piston accumulator against the fluid which is connected to the main cylinder by a fluid passageway. This pressure exerts an upward force on the smaller cross sectional area of the rod side of the main piston seals, and the gas pressure can be adjusted to change the amount of uplift force. It is also possible to have a gas pressure system that allows remote adjustment of the gas pressure. The fluid in the uplift circuit forms a closed system, and a manual or automatic flow control valve can be added between the main cylinder and the uplift accumulator to restrict flow, causing damping of the rebound cycle of the suspension cylinder.

Fluid is introduced into the cylinder by opening the pressure valve for some duration of time, allowing high-pressure fluid from the tractor to flow into the fluid chamber. This high-pressure fluid pushes against the linear compensator accumulator piston, which in turn compresses the gas to equalize the pressures on opposite sides of the piston. The accumulator piston will move back and forth inside the hollow rod when the down pressure is changing, even if the rod is not moving up and down. The length of time the pressure valve remains open corresponds to the size of the adjustment needed. Control is being accomplished in a closed loop fashion based on the planter gauge wheel load. Once the required pressure is achieved, the valve closes so that the actuator is a closed system again. The actuator can then allow the row unit to float up and down, compressing and decompressing the gas in the down-pressure and up-pressure accumulators. This will generate heat in the process—the heat is energy that is being damped from the system. To facilitate the removal of this heat from the system, the portion of the housing 23 that forms the cavity 27 forms multiple cooling fins 42 around its exterior surface.

Figure 15A:
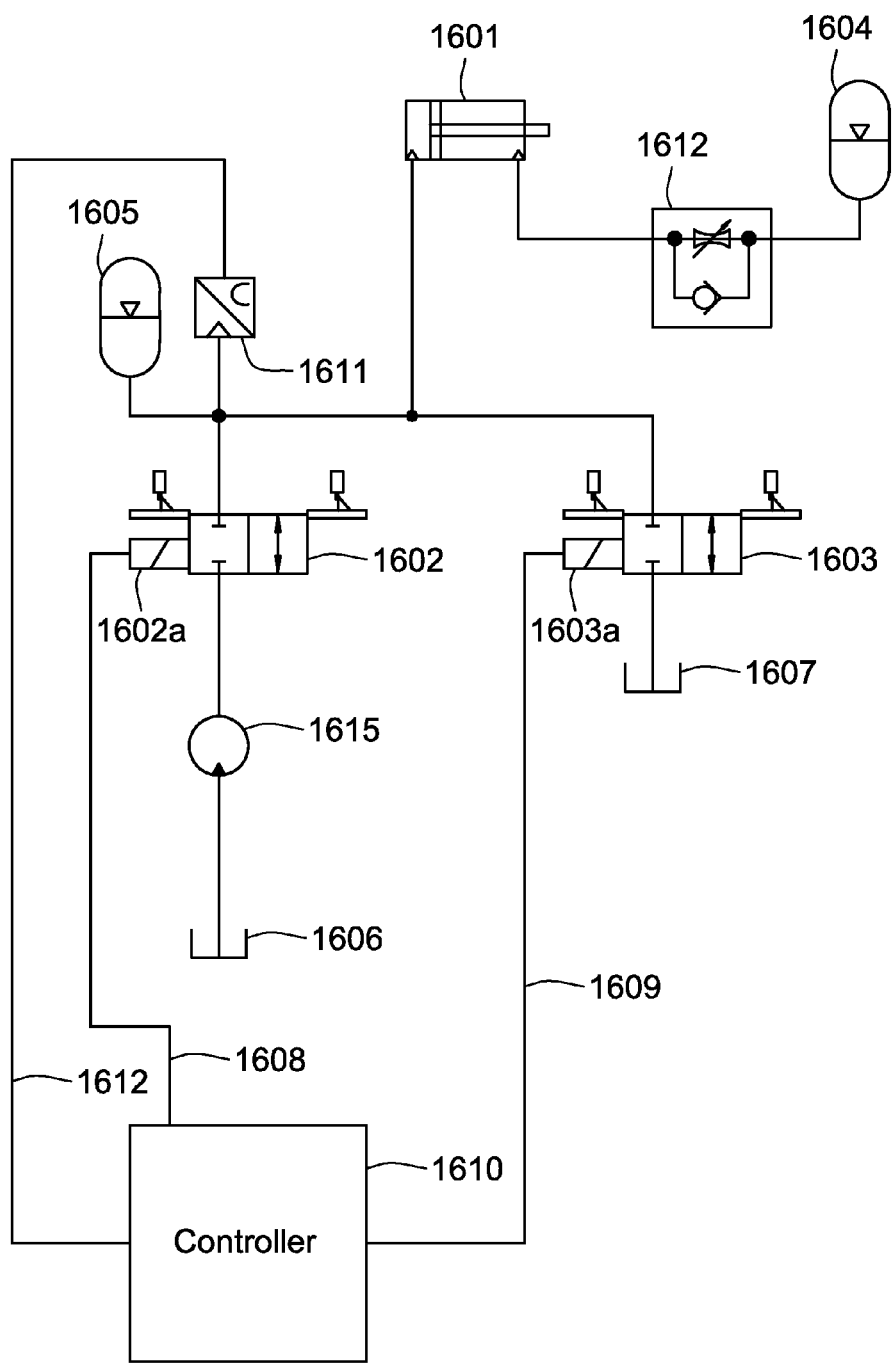
FIG. 15A is a schematic diagram of a hydraulic and electrical control system for use in the device of FIGS. 1-14 to provide rebound damping.

FIG. 15A is a schematic diagram of a hydraulic control system that uses a single hydraulic cylinder 1601, two two-position control valves 1602, 1603 and a pair of accumulators 1604, 1605. The valves are both latching type valves with a single actuator 1602a or 1603a for each valve, for moving the valve to either the open or closed position when the valve is unlatched. When valve 1602 is in the open position, it connects a source 1606 of pressurized hydraulic fluid to the hydraulic cylinder 1601 via pump 1607. When valve 1603 is open, it connects cylinder 1601 to a sump 1607. Electrical signals for energizing the actuators 1602a and 1603a are supplied to the respective actuators via lines 1607 and 1608 from a controller 1609, which in turn may be controlled by a central processor, if desired. The controller 1609 receives input signals from a pressure transducer 1610 coupled to the hydraulic cylinder 1601 via line 1611. The accumulator 1604 is coupled to the hydraulic cylinder 1601 through a valve 1612, as described in more detail below.

Figure 15B:
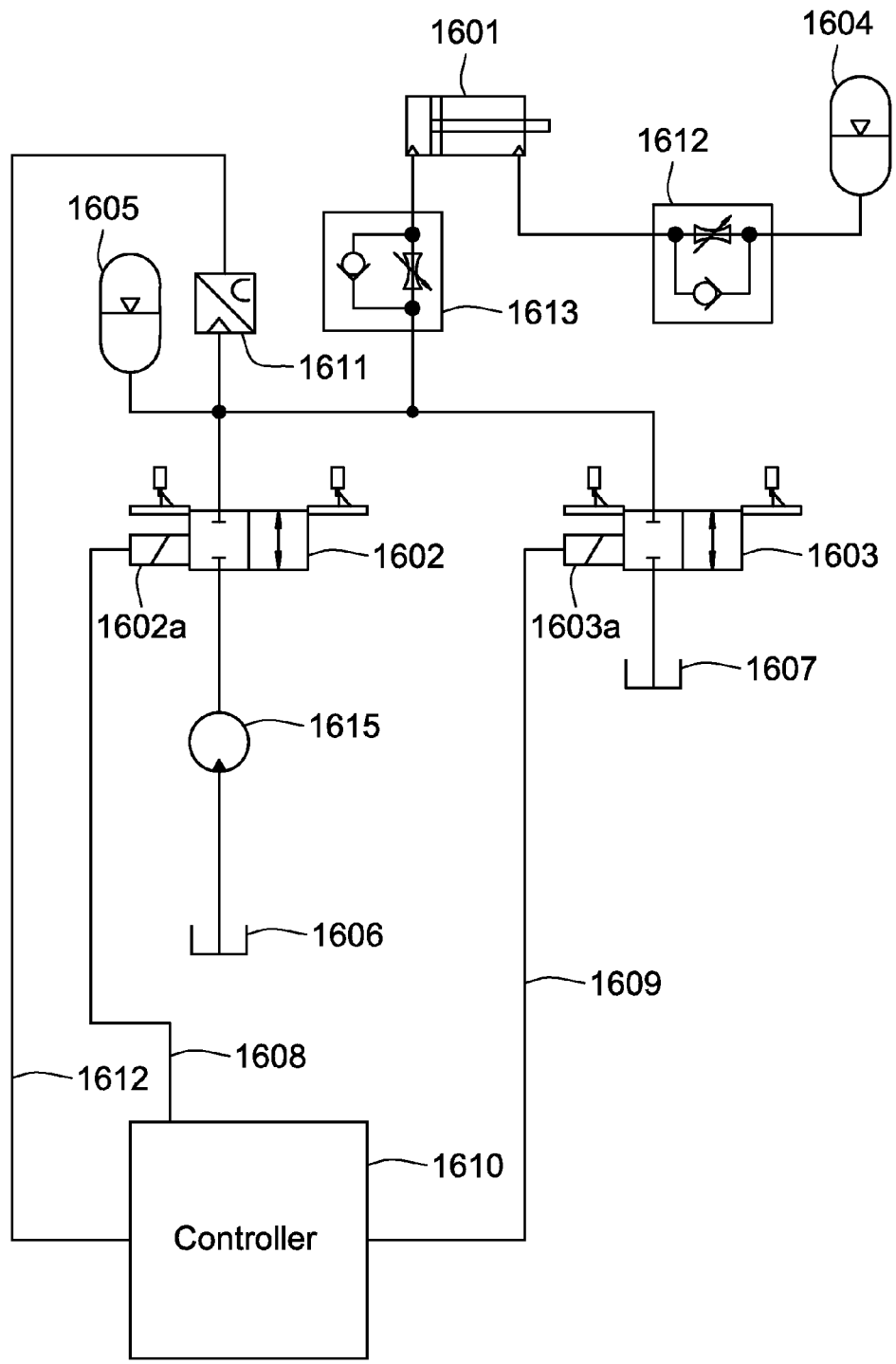
FIG. 15B is a schematic diagram of a modified hydraulic and electrical control system for use in the device of FIGS. 1-14 to provide both rebound and compression damping.
Figure 16A:
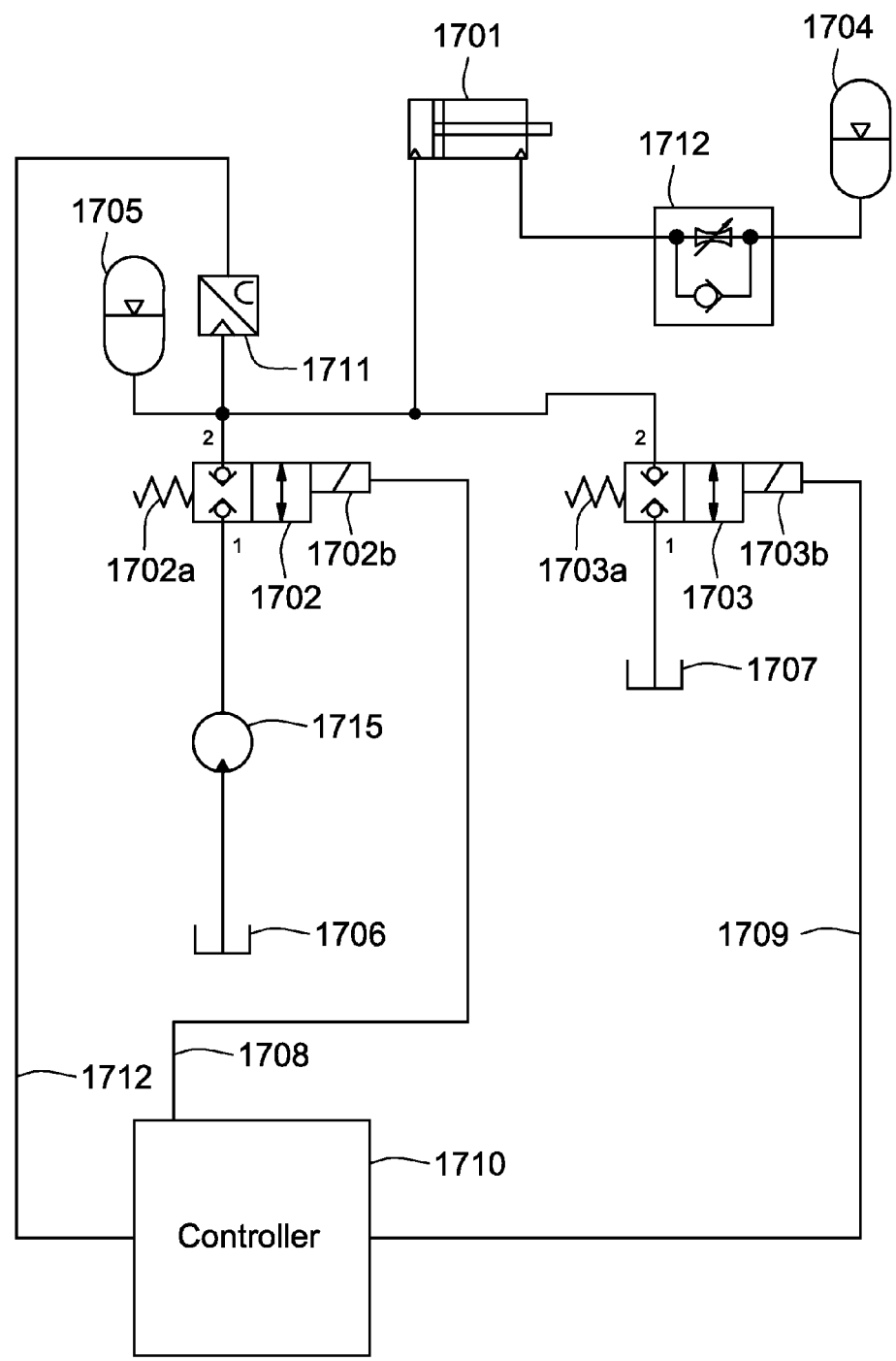
FIG. 16A is a schematic diagram of a modified hydraulic and electrical control system for use in the device of FIGS. 1-14 to provide rebound damping.

FIG. 15B is a schematic diagram of a modified version of the system of FIG. 16A to provide both rebound damping and compression damping. The only difference is that the system of FIG. 15B includes a valve 1613 between the accumulator 1603 and the compression side of the hydraulic cylinder 1601, so that the accumulator 1603 provides compression damping when the rod of the cylinder 1601 is moved from right to left in FIG. 15A.

Figure 16B:
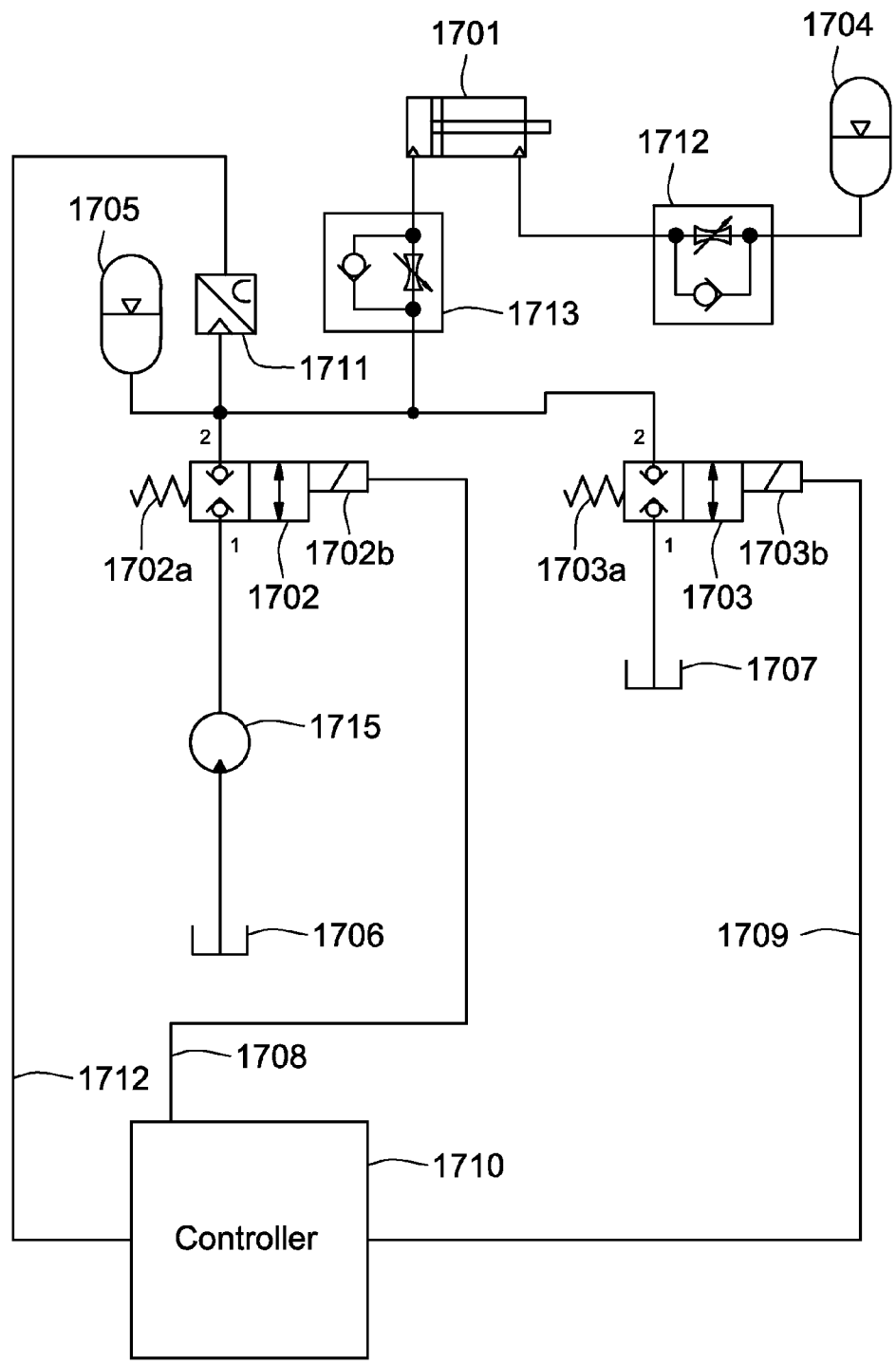
FIG. 16B is a schematic diagram of a another modified hydraulic and electrical control system for use in the device of FIGS. 1-14 to provide both rebound and compression damping.

FIGS. 16A and 16B illustrate systems that are identical to those of FIGS. 15A and 15B, except that the latching valves are replaced with non-latching valves 1702 and 1703. These non-latching valves are biased toward their closed positions by respective springs 102a and 1703a, and can be moved to their open positions by energizing their respective actuators 1702b and 1703b.

Figure 17:
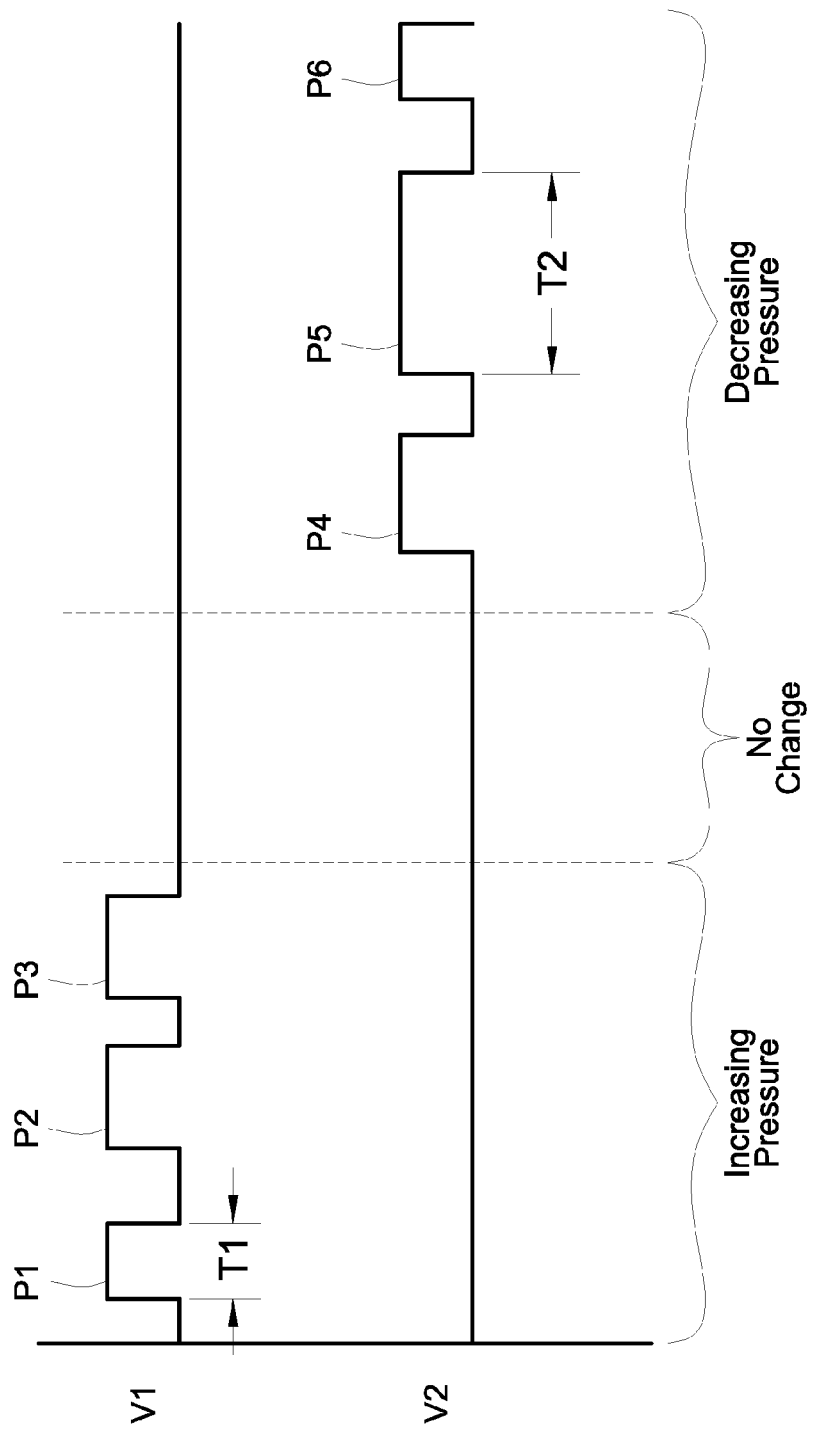
FIG. 17 is a waveform diagram illustrating different modes of operation provided by a PWM control system for the hydraulic valves in the system of FIG. 15B.

In the control system of FIG. 15B, a PWM control system may be used to supply short-duration pulses P to the actuators 1602a or 1603a of the control valves 1602 or 1603 to move the selected valve to its open position for short intervals corresponding to the widths of the PWM pulses. This significantly reduces the energy required to increase or decrease the pressure in the hydraulic cylinder 1601 for adjusting the down pressure on the soil-engaging implement. As depicted in FIG. 17, pulses P1-P3, having a voltage level V1, are supplied to the actuator 1602a when it is desired to increase the hydraulic pressure supplied to the hydraulic cylinder 1601. The first pulse P1 has a width T1 which is shorter than the width of pulses P2 and P3, so that the pressure increase is smaller than the increase that would be produced if P1 had the same width as pulses P2 and P3. Pulses P4-P6, which have a voltage level V2, are supplied to the actuator 1602a when it is desired to decrease the hydraulic pressure supplied to the hydraulic cylinder 1601. The first pulse P4 has a width that is shorter than the width T2 of pulses P2 and P3, so that the pressure decrease is smaller than the decrease that would be produced if P4 had the same width as pulses P5 and P6. When no pulses are supplied to either of the two actuators 1602a and 1603a, as in the "no change" interval in FIG. 17, the hydraulic pressure remains substantially constant in the hydraulic cylinder 1601.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:
1. An agricultural row unit comprising
 a frame having a gauge wheel that engages the soil to control the elevation of the frame,
 a soil-engaging tool coupled to said frame to permit vertical movement of said tool relative to said frame,
 a hydraulic cylinder having a movable rod and containing a pressurized hydraulic fluid for applying a down force to said frame or said tool to urge the tool into the soil,
 an uplift accumulator in fluid communication with said moveable rod to upwardly bias the frame or tool to reduce the gravitational weight of said tool, and
 a down pressure accumulator coupled to said hydraulic cylinder to permit downward movement of said tool in response to increased resistance by the soil to down- ward movement of said tool, while applying a force resisting said upward movement of said tool.

2. The agricultural row unit of claim 1 in which said accumulators are piston accumulators.

3. The agricultural row unit of claim 2 in which said fluid communication between said uplift accumulator and said hydraulic cylinder is restricted to control the rate of downward movement of the tool.

4. The agricultural row unit of claim 2 in which said uplift accumulator includes heat dissipating surfaces to remove heat produced by conversion of kinetic energy to heat during rebound damping.

5. The agricultural row unit of claim 1 which includes controllable valves coupled to said hydraulic cylinder for controlling the coupling of said cylinder to a pressurized hydraulic supply system, and said controllable valves are latching valves.

6. The agricultural row unit of claim 1 in which said down pressure accumulator is concentric with said hydraulic cylinder.

7. The agricultural row unit of claim 6 in which said rod is hollow, and said down pressure accumulator is contained within said hollow rod.

8. The agricultural row unit of claim 1 in which
said rod has a hollow interior and said down pressure accumulator includes a piston that is slidable along the length of said hollow interior of said rod, said piston dividing the hollow interior of said rod into two compartments that are sealed from each other by said piston,
said rod telescoping into said hydraulic cylinder through one end of said cylinder and having an open inner end and a sealed outer end,
the portion of said rod on the side of said piston facing said open end of said rod being filled with pressurized hydraulic fluid which also fills the portion of said cylinder adjacent the open end of said rod, and
the portion of said rod on the side of said piston facing said sealed outer end of said rod being filled with a compressible pressurized gas.

* * * * *